Dec. 11, 1962 H. N. LOVE 3,067,776
HYDRAULIC ACCUMULATOR
Filed April 9, 1956 2 Sheets-Sheet 2
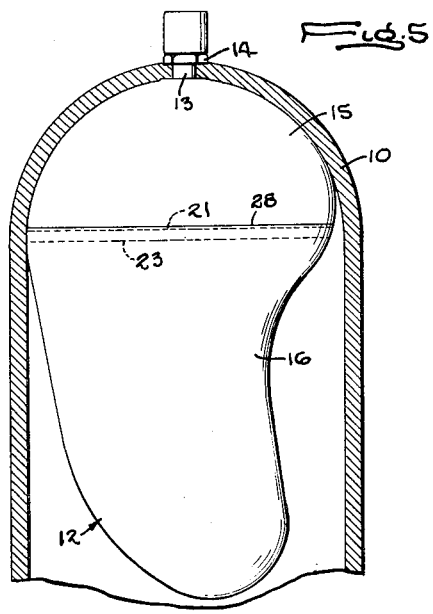
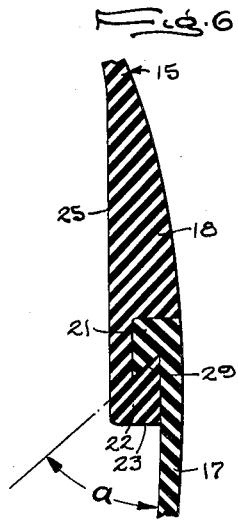
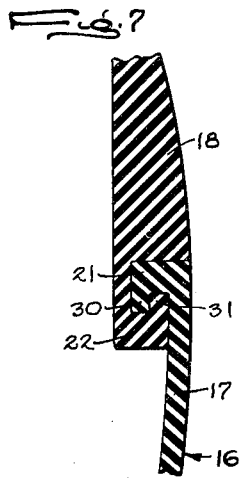
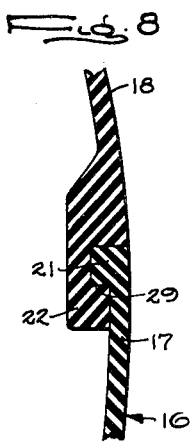
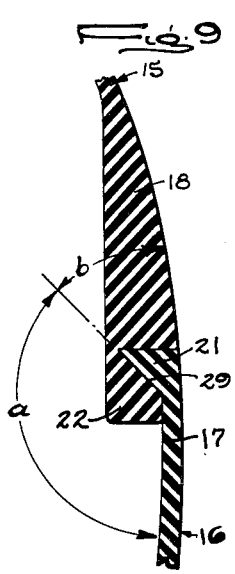
INVENTOR
Harold Morris Love
By Carlson, Pitzner, Hubbard & Wolfe
ATTORNEY United States Patent Office 3,067,776
Patented Dec. 11, 1962

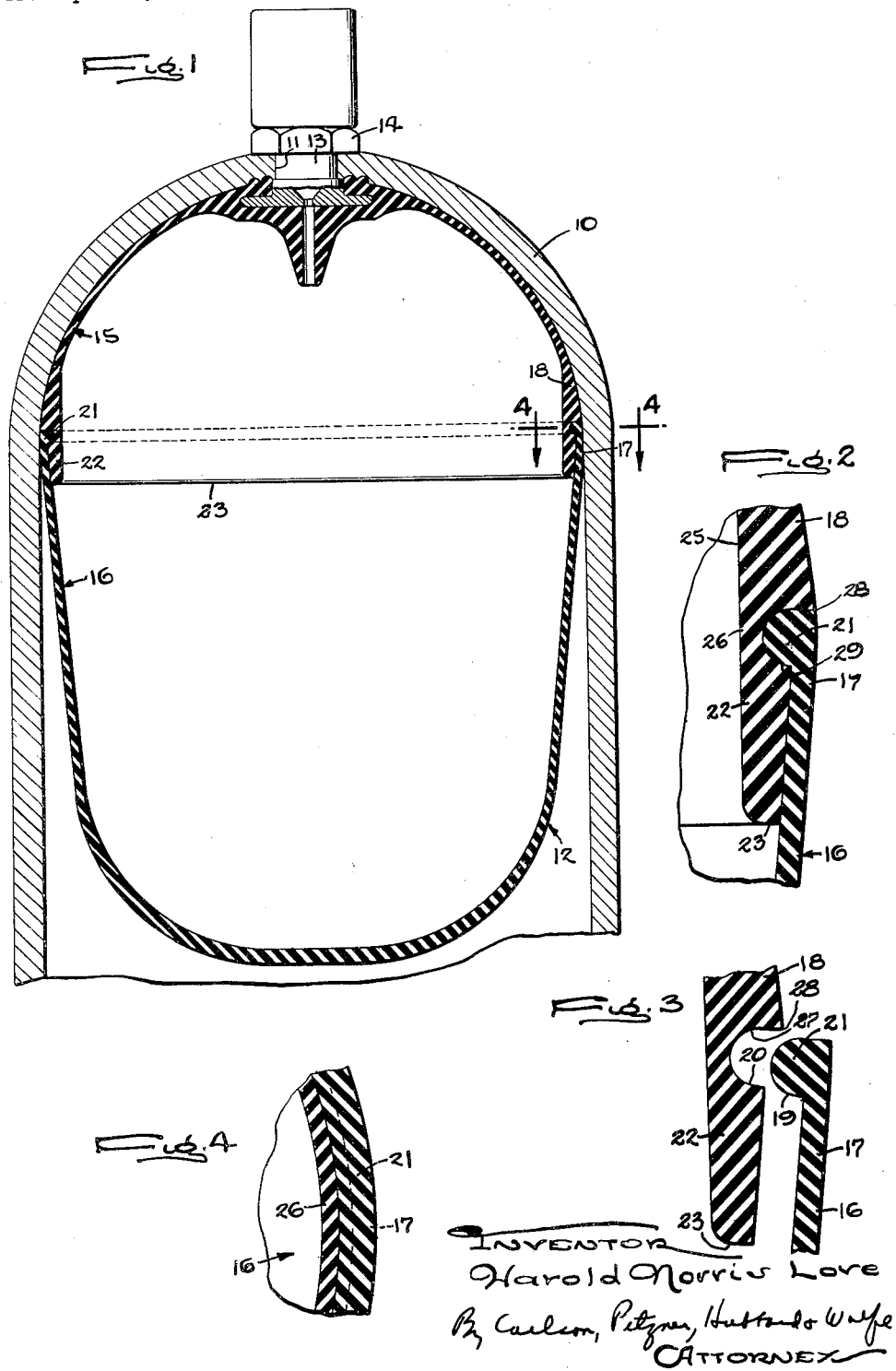

3,067,776
HYDRAULIC ACCUMULATOR
Harold Norris Love, Chicago, Ill., assignor to Ideal Roller and Manufacturing Company, Chicago, Ill., a corporation of Illinois
Filed Apr. 9, 1956, Ser. No. 576,958
1 Claim. (Cl. 138—30)

This invention relates to hydraulic accumulators of the type having an inflatable bladder of rubber or the like disposed within a rigid tank and anchored to one end of the latter around an air inlet opening. Heretofore bladders of this character have been composed of two cups having tapered edge margins or lips which overlap and telescope with each other and are cemented and thereby sealed together to form a seam of substantially the same wall thickness as the remainder of the bladder cups. The surfaces thus joined frequently become separated in service, such failure usually being due to the trapping of a small air bubble within the seam during the cementing operation.

The present invention aims to avoid such failures by shaping the overlapped parts of the seam in a novel manner such as to utilize the pressure within the bladder to hold the parts sealed together in interlocked relation even in the absence of the adhesive between the contacting surfaces.

A more detailed object is to increase the thickness and shape the overlapped margins of the bladder parts to form beads which interlock in a novel relation and provide a fluid tight joint which is compressed by the internal pressure within the bladder and, in all degrees of flexure of the bladder, is held tightly against the rigid tank wall or the body of noncompressible liquid with which the accumulator is charged.

The invention also resides in the novel manner of overlapping the beaded lips of the two cups to maintain the interlocked relation as the liquid forced into the tank reaches the seam and bends the same inwardly away from the tank wall.

Other objects and advantages of the invention will become apparent from the following detailed description taken in connection with the accompanying drawings, in which FIGURE 1 is a fragmentary longitudinal sectional view of an accumulator embodying the novel features of the present invention.

FIG. 2 is a fragmentary enlargement of a part of the bladder seam.

FIG. 3 is a view similar to FIG. 2 with the parts separated.

FIG. 4 is a section taken along the line 4—4 of FIG. 1.

FIGS. 5 to 9 are fragmentary views similar to FIG. 2 showing modified forms of the interlocked joint.

The accumulator shown in the drawings is of the so-called Greer type comprising an elongated rigid tank 10 of circular cross section rounded at its ends and having an opening 11 around which is secured one end of an inflatable bladder 12 molded to a shape corresponding to but smaller than the interior of the tank. In accordance with standard practice, the stem 13 of a valve is molded into one end of the bladder and projects through the opening 11 for engagement with a nut 14 by which the bladder end is clamped to the tank.

As in prior accumulators of the present type, the bladder is relatively thin walled and composed of resiliently flexible material such as oil resistant rubber. It comprises two molded cups 15 and 16 of substantially uniform wall thickness and having bottoms rounded to conform approximately to the contour of the tank ends. The marginal edge portions or lips 17 and 18 of the two cups overlap and telescope closely with each other to form a seam. Where, as here, the tank is made as one rigid piece, it is desirable to cement the contacting surfaces of the overlapping lips together so that the bladder will remain intact when crumpled or compacted to permit insertion of the bladder as a unit through the liquid opening (not shown).

The present invention contemplates a novel construction of the telescoped parts of the seam to form an interlocked joint which is compressed radially under the internal pressure existing within the bladder and, independently of any cement that may be used between the joint surfaces, utilizes such pressure in maintaining the interlocked surfaces in full fluid tight contact under all conditions of edgewise stressing and flexing of the bladder. Such interlocking of the overlapping cup lips 17 and 18 is achieved by thickening the lip edges to form interlocked surfaces 19 and 20 which abut at a junction line 29 extending transversely of the bladder wall at an angle sufficiently large to preclude wedging of the surfaces apart and separation thereof under the edgewise tension which accompanies the radial compression of the joint against its external backing. To this end, the surface 19 is defined by the inner edge of a bead 21 extending around the interior of the outer lip 17 at the edge thereof. The surface 20 is defined by the inner edge of a bead 22 extending around the exterior of the inner lip 18.

In the form shown in FIGS. 1 to 3, the bead 21 is of semicircular cross section and molded integral with the extreme edge of the cup lip 17 so as to project inwardly a distance about equal to the wall thickness of the cup 16. The second bead 22 is somewhat greater in axial width in this instance and is molded to a shape which complements the inner edge of the bead 21 and then extends a short distance along the inner surface of the lip 17 to an edge 23. Beyond the bead 21, the lip 18 preferably follows around the opposite edge of the latter bead and across the end of the lip 17 preferably to a point 28 so that the outer surfaces of the two lips will be substantially flush with each other. This avoids the trapping of pockets of liquid between the bladder and the tank wall as the seamed portion of the bladder comes back against the tank wall during the flow of liquid out of the tank.

To facilitate removal of the cup 15 from the mold in which it is formed, its wall thickness is increased progressively in approaching the interlocked joint, the inner surface 25 being substantially flush with the inner surface of the bead 22. At a point 26 opposite the bead 21, the thickness of the lip 18 is substantially equal to that of the bladder wall beyond the edges of the seam. The lip 18 thus contoured defines an outwardly opening peripheral groove 27 spaced axially from the edge 23 of the lip and complementing the shape of the bead 21 which fits closely in the groove.

The beads 21 and 22 which are interlocked to join the cup lips together may be of various other shapes some of which are shown in FIGS. 6, 7, and 8. In FIG. 6, the junction line 29 which maintains effective interlocking of the beads is inclined relative to the bladder wall and makes a substantial included angle $a$, 45 degrees in this instance, with the lip 17. The beads are in effect hooked together and thus interlocked even more effectually than in FIG. 1. In FIG. 6, the opposite sides of the beads which define the extreme edges of the cup lips are squared and, as before, the lip 18 is flared toward the seam to provide a smooth outer surface on the bladder and facilitate removal of the cup 15 from its mold.

The area of the junction 29 may be increased, if desired, by making the beads 21 and 22 of L-shape as shown in FIG. 7 with the leg 30 on the bead 21 extending reversely and cooperating with the lip 17 to form a groove for receiving a corresponding flange 31 on the bead 22. When hooked together as shown, the beads will contact each other along a junction line 29 of Z-shape thus becoming interlocked positively in two perpendicular directions extending transversely and longitudinally of the bladder wall.

Positive interlocking of the beads 21 and 22 at a junction line 29 perpendicular to the bladder wall may also be achieved by molding the beads to square shapes as shown in FIG. 8. As in FIG. 6, the sides of the beads defining the extreme ends of the beads are also at right angles to the bladder wall.

Less effective but nevertheless adequate interlocking may be achieved as shown in FIG. 9 by inclining the junction line reversely as compared to FIG. 6. That is to say, the angle $a$ is obtuse, the acute angle $b$ included between the line 29 and the other lip 18 being about 45 degrees. When the junction is thus inclined, the angle $b$ must be of such substantial magnitude that the internal pressure acting in compression on the seam prevents the beads from being cammed or wedged apart under the maximum edgewise tension to which the seam is subjected in service use.

When the bladder constructed as above described is mounted within the tank, the seam formed by the overlapping of the lips 15 and 16 and the interlocking of the beads 21 and 22 is at all times during service operation pressed outwardly and radially by the air pressure within the bladder and thus held at all points either against the tank wall or against the surface of the liquid that may separate the seam from the tank wall. In either case, the seam and all other areas of the bladder exterior are backed by a nonyielding medium, the rigid tank in one instance and the noncompressible liquid at other times. This condition of effective backing obtains at all times regardless of the degree of flexing or the irregular shapes (FIG. 5) which the bladder may assume in service use.

The present invention takes advantage of the above described and heretofore unused characteristics and utilizes the same in combination with the internal bladder pressure to perform a new function, namely, to maintain fluid tightness of the interlocked joint and thereby provide a substitute for the adhesive which has led to the frequent failure of prior constructions. As will be apparent from the foregoing, the performance of this new function is achieved by interlocking the two bladder parts at the overlapping margins of the junction line 29 which is extended transversely of the bladder wall by interengaging the beads in a hooked relation (FIGS. 6 and 7), or by disposing the line substantially normal to the bladder wall (FIGS. 1 and 8), or at a substantial angle $b$ (FIG. 9) relative to the wall of the anchored cup 15. When the beads are interlocked in one of these relations and the resulting seam is maintained under radial compression, the overlapped parts are held effectually against relative displacement or separation under any edgewise stretching of the seam that may be encountered in service use. Fluid tightness of the joint is thus attained without reliance on the adhesive which may be used to hold the overlapped cup lips in proper relation while the bladder is being inserted into the tank through the liquid opening. Even the trapping of an air bubble within the seam, as for example during such cementing of the surfaces together, does not, as in the case of prior bladders of the present type, destroy the effectiveness of the seal. Any such bubble would be compressed and forced out through the edges of the seam when the later becomes subjected to increased compression in service use of the accumulator. Then, the areas formerly separated by the bubble would come back into full contact and be sealed together effectually in the manner described above even though not cemented together.

In each form of the interlocked seam described above, it will be observed that the lip 17 of the free floating cup 16 is disposed externally of and surrounds the lip 18 which telescopes within the lip 17. This arrangement is preferred as a means of minimizing the possibility of the surfaces 19 and 20 becoming separated at any point as the seam starts to bend and separate from the tank when a predetermined amount of liquid has been pumped into the tank. That is to say, in its movement inwardly and away from the tank wall, the edge of the lip 17 forces the bead 22 inwardly thus maintaining the entire joint intact.

In the service operation of the accumulator, the bladder is inflated with air delivered through the stem 13 and expanded usually to the full size of the tank. As liquid is pumped into the other end of the tank to charge the accumulator, the flexible wall of the bladder is forced away from the tank progressively beginning at the free end of the bladder. At all times, however, the bladder wall is solidly backed by a noncompressible surface defined either by the interior of the tank (FIG. 1) or by the mobile liquid between the wall and the tank. Because the rubber material forming the cups 15 and 16 acts as a noncompressible fluid and since all parts of the seam are subjected to the same unit surface pressure, neither of the beads 21 and 22 can be flattened enough, in spite of the high pressures frequently involved, to permit of edgewise slipping past the other bead. The internal pressure is thus utilized effectually to maintain the interlocked relation of the two beads even though the seam between the two cups may be subjected to edgewise stresses during operation of the accumulator.

As a result, all of the overlapped areas of the seam are clamped tightly together and so remain in all of the different and irregular shapes which the bladder may take during service cycling of the accumulator. As the shape of the bag is changed, the thickened annular band formed by the seam must bend in various directions. This occurs however without opening any leaks or passages edgewise through the seam because, irrespective of the nature of the flexing, the entire area of the seam is always backed by a noncompressible medium.

While the accumulator selected for illustration is particularly adapted for inflation of the bladder by air and charging of the accumulator by pumping liquid into the tank around the bag, it will be obvious that the positions of the two fluids may be reversed, the air then being outside of the bladder. In such a modification, the overlapped portions of the beaded cups would be sealed together in the manner above described, the liquid within the bladder constituting the noncompressible medium against which the seam is clamped by the pressure of the surrounding air.

I claim as my invention:

An accumulator having, in combination, a rigid closed tank containing liquid under pressure and having a curved peripheral wall and an inlet at one end and an outlet at the other end, an inflatable bladder disposed within said tank cooperating with the internal wall of said tank to define a chamber for containing said liquid, said bladder comprising first and second cups molded of resiliently flexible material and having open peripheral ends terminating in lip portions in overlapping and telescoped relation one with respect to the other, one of said cups having an apertured bottom, means clamping said apertured bottom to the end of said tank around said inlet, the other cup having a closed bottom, one of said cups having a radially opening peripheral groove spaced axially from its lip, a peripheral bead complementing the cross sectional shape of said groove and formed around the other cup and fully seated in said groove so as to abut and interlock with the opposed walls of said groove, one wall of said groove being of sufficiently greater radial depth than the other wall to dispose the adjoining outer surfaces of the two cups substantially flush with each other so as to provide a continuous smooth outer periphery which is flexible during expansion and contraction of said bladder with the entire area of such periphery backed by and pressed against said wall or the liquid in said chamber when the bladder is inflated.

References Cited in the file of this patent

UNITED STATES PATENTS

| | | |
|---|---|---|
| 980,355 | Spencer | Jan. 3, 1911 |
| 1,867,430 | Wisner | July 12, 1932 |
| 2,129,105 | Spence | Sept. 6, 1938 |
| 2,366,067 | Smith | Dec. 26, 1944 |
| 2,389,791 | Lippincott | Nov. 27, 1945 |
| 2,392,085 | Ferrel | Jan. 1, 1946 |
| 2,397,796 | Lippincott | Apr. 2, 1946 |
| 2,465,908 | Mercier | Mar. 29, 1949 |
| 2,567,773 | Krupp | Sept. 11, 1951 |
| 2,592,130 | Erb et al. | Apr. 8, 1952 |
| 2,718,980 | Strom | Sept. 27, 1955 |
| 2,782,805 | Leadbetter | Feb. 26, 1957 |
| 2,889,847 | Schober | June 9, 1959 |